United States Patent [19]

Carlson

[11] 4,007,647
[45] Feb. 15, 1977

[54] CHOKE CONTROL ASSEMBLY
[75] Inventor: John A. Carlson, Wichita, Kans.
[73] Assignee: Conchemco, Incorporated, Lenexa, Kans.
[22] Filed: Aug. 13, 1975
[21] Appl. No.: 604,321
[52] U.S. Cl. .............................. 74/501 R; 74/103; 74/502
[51] Int. Cl.² ......................................... F16C 1/10
[58] Field of Search ............... 74/501 R, 470, 471, 74/543, 107, 103, 102, 99 R, 502; 251/205, 294

[56] References Cited
UNITED STATES PATENTS

| | | | |
|---|---|---|---|
| 1,432,103 | 10/1922 | Feller | 251/294 X |
| 1,619,117 | 3/1927 | Gray | 251/294 X |
| 3,419,246 | 12/1968 | Burgess | 251/205 |
| 3,439,555 | 4/1969 | Rech | 74/501 R |
| 3,625,085 | 12/1971 | Shrode | 74/501 R |

Primary Examiner—Samuel Scott
Assistant Examiner—F. D. Shoemaker
Attorney, Agent, or Firm—Schmidt, Johnson, Hovey & Williams

[57] ABSTRACT

A choke control assembly for use in connection with dual carburetors or the like has a linearly reciprocal slide member carried by a body adapted to be secured to a mounting panel. A swingable lever is secured at one end of the slide member with a pair of control cables secured at an opposite end thereof. The lever is selectively swingable from a normal, non-choke position to either of two alternate over-center positions to shift the slide member against the bias of a spring which maintains corresponding cam surfaces of the lever in abutment with the body. The slide member includes a crossarm adapted to receive a pair of laterally disposed cables in order that two carburetors may be simultaneously controlled by the action of the single lever.

10 Claims, 7 Drawing Figures

U.S. Patent
Feb. 15, 1977
4,007,647
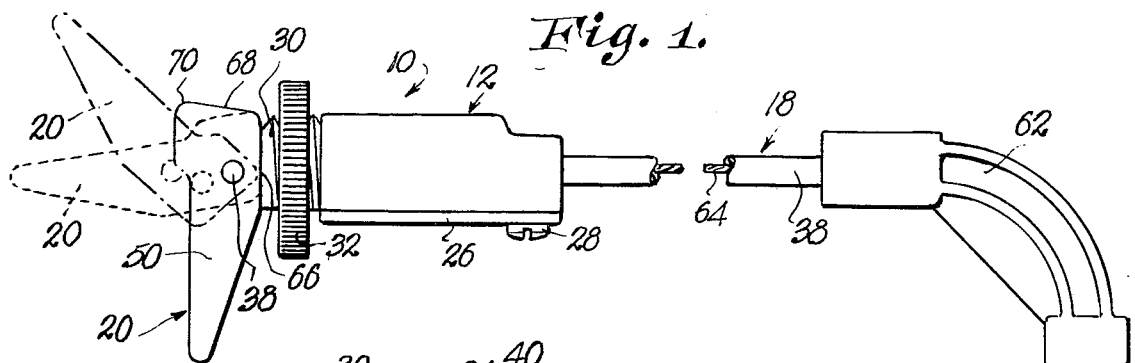
Fig. 1.
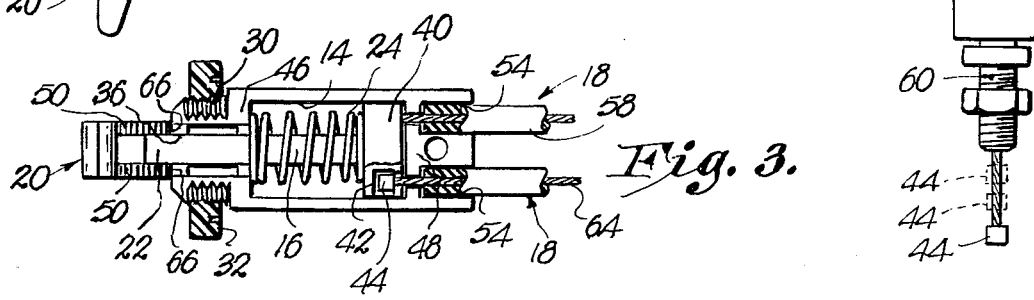
Fig. 3.
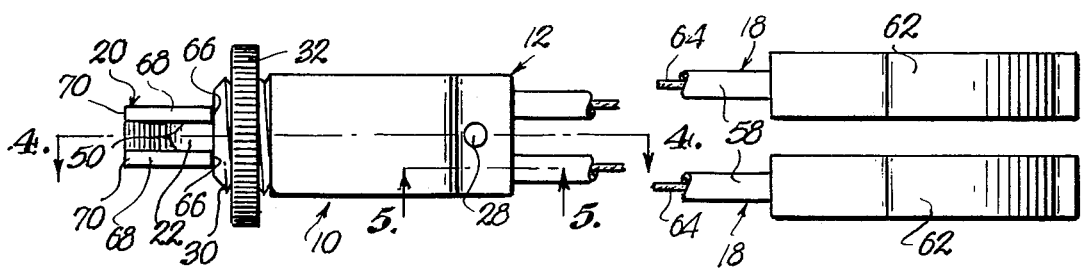
Fig. 2.
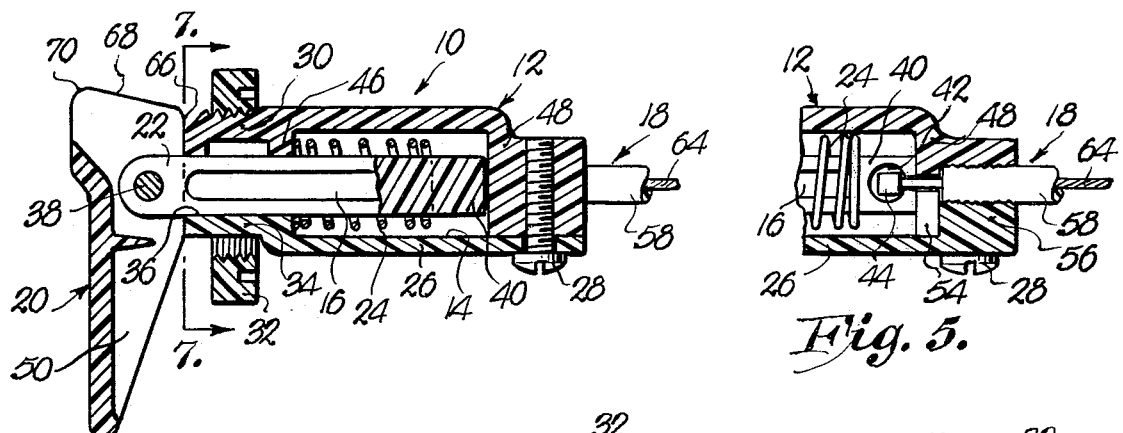
Fig. 4.
Fig. 5.
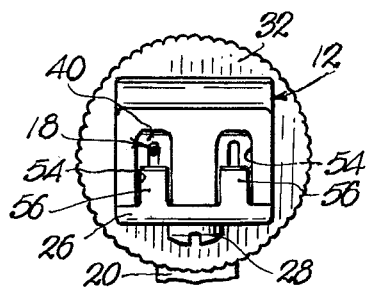
Fig. 6.
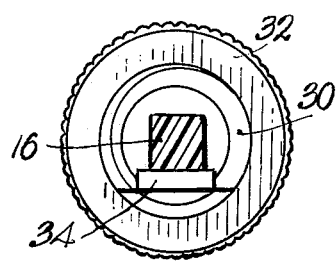
Fig. 7.

CHOKE CONTROL ASSEMBLY

This invention relates to a control assembly such as may be utilized in connection with the carburetor choke of an engine or the like and, more particularly, relates to a choke control for use on snowmobiles.

It is, therefore, a very important object of my invention to provide a control assembly for use in selectively and remotely regulating an adjustable device to obtain at least one degree of adjustment.

It is a further important object of the invention to provide a control assembly in which an engine carburetor choke or the like might be remotely controlled by the shifting of a lever to provide at least one degree of choking.

Yet another important object of the invention is to provide a choke control assembly wherein the lever may be flipped from a normal non-choke position to at least one choke position and be retained therein until such time as manually returned to its normal position.

A still further object of the invention is to provide a choke control assembly in which the choke is uniformly set at substantially the same setting each time the lever is placed in a corresponding choke position.

Yet another object of the invention is to provide a choke control in which a plurality of cables for controlling a corresponding number of carburetors may be shifted in unison by a single lever.

In the drawing:

FIG. 1 is a fragmentary, elevational view of a choke control assembly made pursuant to the present invention and illustrating a lever thereof in a normal, non-choke position with alternate choke positions being shown by way of broken lines;

FIG. 2 is a fragmentary plan view of the choke control assembly with the lever disposed in its normal position;

FIG. 3 is a fragmentary plan view illustrating the control body with the cover thereof removed and portions broken away and shown in section to reveal details of construction;

FIG. 4 is a cross-sectional view taken along line 4—4 of FIG. 2;

FIG. 5 is a cross-sectional view taken along line 5—5 of FIG. 2;

FIG. 6 is an end elevational view of that end of the body opposite the control lever and illustrating a single control element in section; and FIG. 7 is a cross-sectional view taken along line 7—7 of FIG. 4.

A choke control assembly, broadly identified by the numeral 10, is comprised of an elongate body 12 having a cavity 14 therein in which an elongate slide member 16 is disposed for longitudinal reciprocation and to which a pair of bowden cable assemblies 18 are operably secured. Additionally, the control assembly 10 is provided with a lever 20 pivotally secured to an end 22 of the slide member 16 opposite the cable assemblies 18 and a compression spring 24 located within the cavity 14. The body 12, slide member 16, and lever 20 may be economically constructed of plastic or other material suitable for molding.

The generally rectangular body 12 is provided with a cover 26 that generally defines one side thereof and is removably secured thereto by a fastener 28 in order that access may be gained into the cavity 14 upon removal of the cover 26. One end of the body 12 presents a reduced, threaded neck portion 30 adapted to receive a panel nut 32; the portion 30 and nut 32 cooperating to provide means for securing the body 12 to a mounting panel (not shown) or the like. The cover 26 includes an offset tongue 34 which is received in the neck portion 30 and over which the panel nut 32 is threaded and cooperates with the fastener 28 in retaining the cover 26 in position on the body 12.

The end 22 of the slide member 16 extends through an opening 36 axially located in the neck portion 30, the opening 36 being of a generally square configuration corresponding to that of the slide member 16. The lever 20 is pivotally secured for swinging movement about a transverse axis through the use of a groove pin 38. A crossarm 40 opposite the lever 20 and located in the cavity 14 defines the inner end of the slide member 16 and is provided with a pair of laterally disposed sockets 42 in which respective end fittings 44 for cables 64 forming a part of corresponding cable assemblies 18 are received. Interposed between the crossarm 40 and an end wall 46 of the body 12 adjacent the neck 30, such that the slide member 16 is biased in the direction of an opposite end wall 48 of the body 12, is the spring 24.

Lever 20 presents a generally U-shaped transverse configuration having longitudinal sidewalls 50 which receive the end 22 of the slide member 16 therebetween with the groove pin 38 extending from one side 50 to the other to define an axis of rotation.

End wall 48 of the body 12 has a pair of open-ended slots 54 that extend inwardly from the cover 26 to provide access for the control cables 18 and are in alignment with corresponding sockets 42 located in the crossarm 40 of the slide member 16. The cover 26 is provided with a pair of laterally arranged knurled lugs 56 which project into the apertures 54, as best shown in FIG. 6, for the purpose of clamping a respective conduit 58 of the cable assembly 18 against the end wall 48 at the adjacent closed end of each associated slot 54, which also present a knurled surface.

Each cable assembly 18 terminates at its distal end in a swivel adaptor 60 forming a part of a plastic molded elbow 62 with its cable 64 extending beyond the adaptor 60. While an end fitting 44, identical to the previously mentioned fittings 44, located in the sockets 42 of the slide member 16, is provided on the free end of each cable 64, any suitable fitting may be utilized, depending on the requirements of the device with which the control assembly 10 is associated.

In use, the control assembly 10 is installed with the body 12 being secured to a control panel or the like through use of the panel nut 32 with the distal ends of the cable assemblies 18 being operably secured to a pair of carburetors by their adaptors 60 (only one of which is shown) with the end fittings 44 there adjacent being properly seated for operation of the respective chokes. It is to be understood that while the utilization of this control assembly 10 is described as being in connection with the chokes of a dual carburetor arrangement on a snowmobile, the control assembly may be adapted for use in connection with other devices requiring similar adjustments, either as a single control or as a dual control for unitary action as herein described.

Normal disposition of the lever 20, after the control assembly 10 has been installed, is as shown by the solid lines in FIG. 1, with the longitudinal edges of the sides 50 in abutment with the neck portion 30 exteriorly of the body 12 by virtue of the action of the spring 24 in the cavity 14 biasing the slide member 16 in the direction of the cable assemblies 18 and toward the end wall 48. Rotation of the lever 20 about the axis 38 in an upward direction to a position illustrated by the dotted lines in FIG. 1 places the end edges 68 of the lever sidewalls in abutment with the body 12.

Thus, the lever 20 acts as a cam, as defined by the edge surfaces 68, to shift the slide member 16 linearly in the direction of the lever against the bias of spring 24 thereby also shifting the cables 64 longitudinally within their respective conduits 58 such that the corresponding end fittings 44 at the distal ends are repositioned as shown by the dash line position in FIG. 1. The fact that the relative location of the axis 38 with respect to the edges 66 and 68 of the lever causes the same to move in an over-center manner, permits the lever 20 to retain its alternate position until such time as it is manually repositioned, at which time the cables 64 return to their original dispositions. Reference to FIG. 1 will reveal that the rotational movement of the lever 20 results in longitudinal displacement of the slide member 16 relative to the body 12.

Further rotation of the lever 20 to a position shown by broken lines in FIG. 1 places the arcuate corners 70 of the lever sides 50 in abutment with the body 12 and further compresses the spring 24 to further retract the cables 64 relative to their conduits 58. The corners 70 cooperate to define a second cam surface which guides the lever to a second over-center position for retaining the same in this disposition until manually shifted back to its first alternate position or returned to its normal position.

It is to be noted that at all times the slide member 16 is under the biasing influence of the spring 24 to normally continually retain the lever 20 in abutment with the body 12 and in either of its previously described positions. Thus, it will be appreciated that the control assembly herein disclosed permits rapid, accurate and repeatedly consistent adjustment of a choke or other device in either of two positive settings as represented by the two alternate positions to which the lever 20 may be rotated. The over-center arrangement permits an operator to quickly relocate the lever 20 to correspondingly reposition the cables 64 by simply "flipping" the lever to the desired setting.

Having thus described the invention, what is claimed as new and desired to be secured by Letters Patent is:

1. A control assembly including:
   an elongate body having mounting means thereon for attachment to a mounting panel or the like;
   an elongate slide member carried by said body for longitudinal non-rotatable reciprocation relative thereto,
   said slide member having at least one end projecting beyond said body;
   a lever secured to said one end of said slide member;
   at least one control element secured to and extending from an opposite end of said slide member for the reciprocable shifting movement therewith; and
   means for biasing said slide member in the direction of said control element and for maintaining said lever in abutment with said body,
   said lever being selectively shiftable relative to said slide member and said body from a normal position to at least one alternate position in which said slide member is shifted against the action of said bias means in the direction of said lever to correspondingly reposition said control element.

2. A control assembly as claimed in claim 1, wherein said lever is pivotally secured to said slide member for shifting about an axis perpendicular to the longitudinal axis of said slide member.

3. A control assembly as claimed in claim 2, wherein said lever is provided with a cam surface disposed to be in said abutment with said body for shifting said slide member in the direction of said lever when the latter is shifted to said alternate position.

4. A control assembly as claimed in claim 3, wherein said axis and said cam surface are arranged relative to one another such that said lever is disposed in an over-center condition for releasably retaining said lever in said alternate position.

5. A control assembly as claimed in claim 4, wherein there is a pair of cam surfaces on said lever, said surfaces being angularly displaced relative to each other and said axis such that the lever may be selectively positioned in either of two alternate positions for repositioning said control element in either of two corresponding positions.

6. A control assembly as claimed in claim 3, wherein said bias means is a coil spring.

7. A control assembly as claimed in claim 3, wherein there is a plurality of control elements secured to said slide member, said elements being repositionable in unison when said slide member is shifted by said lever.

8. A control assembly as claimed in claim 7, wherein said slide member includes a transverse crossarm disposed at an end opposite said one end thereof, said plurality of control elements being secured to said crossarm in a laterally adjacent relationship.

9. A control assembly as claimed in claim 3, wherein said control element is a bowden cable assembly having a conduit, said body including clamping means integral therewith for operably securing said conduit thereto.

10. A control assembly as claimed in claim 1, wherein said lever is pivotally secured to said slide member; said lever having means thereon in engagement with said body for shifting said slide member along a substantially linear path of travel as said lever is caused to shift along an arcuate path of travel between said normal position and said alternate position.

* * * * *